Patented May 8, 1945

2,375,659

UNITED STATES PATENT OFFICE 2,375,659

ALKOXYPROPYLAMINE CONDENSATION PRODUCTS

Louis C. Jones, Greenwich, and Walter P. Ericks, Stamford, Conn., assignors to American Cyanamid Company, New York, N. Y., a corporation of Maine No Drawing. Application April 24, 1942, Serial No. 440,354

5 Claims. (Cl. 260—564)

This invention relates to substituted guanidine derivatives prepared by the condensation of alkoxypropylamines with alkylol cyanamides. The invention includes the condensation products themselves as well as their methods of preparation and compositions containing them.

We have found that cation-active materials having improved surface-active properties are obtained by the condensation of alkylol cyanamides with alkoxypropylamines in the presence of an acid which will produce a substantially neutral salt of the reaction product. The products obtained by this condensation are probably guanidines or guanidine derivatives of the formula

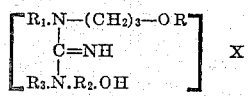

wherein R may be any alkyl radical but is preferably a radical containing at least 5 carbon atoms, $R_1$ is hydrogen or an alkoxypropyl radical, $R_2$ is an alkyl, alkoxyalkyl or hydroxyalkyl radical, $R_3$ is hydrogen or, when the dimer of a monalkylol cynamide is employed, the residue

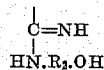

and X is a salt-forming acid.

The exact chemical constitution of the monoalkylol cyanamides has not as yet been definitely established. However, they are believed to be compounds of the probable formula

in which $R_2$ is as defined above. These compounds are quite reactive, and under the influence of heat they will form a dimer which has the probable formula

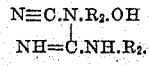

in which $R_2$ is as defined above. Either the monomer or the dimer will condense with an alkoxypropylamine to form a guanidine or guanidine derivative in accordance with the present invention.

The monoalkylol cyanamides and their dimers may be prepared by the condensation of an alkylene oxide with sodium, calcium, or other cyanamide salt as described in U. S. Patent No. 2,244,421, and monoalkylol cyanamides prepared by the methods described in this patent may be used in practicing the present invention. It should be understood that alkoxyalkylol cyanamides containing two or more $CH_2.CH_2.O$— groups linked together can be obtained by the methods described in this patent, as well as monopropylol cyanamide, mono-2,3-dihydroxypropylol cynamide, tetramethylethylol cyanamide and other alkylol and hydroxyalkylol cyanamides, and any of these may be condensed with alkoxypropylamines to form condensation products included within the scope of the present invention.

The alkoxypropylamines are advantageously prepared by condensing equimolecular quantities of an alcohol and acrylonitrile in the presence of a small amount of a soluble alkaline catalyst such as an alkali metal alcoholate to form the corresponding 3-alkoxypropionitrile followed by catalytic hydrogenation of the nitrile to an amine. The hydrogenation is preferably carried out within the temperature range of 70–175° C. at pressures of 20–250 atmospheres in the presence of a hydrogenation catalyst such as Raney nickel, copper or cobalt. The conditions of this hydrogenation may be controlled in such a manner that either the primary alkoxypropylamine $$RO(CH_2)_3NH_2$$

or the corresponding secondary amine

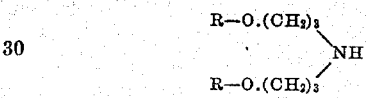

is obtained, or mixtures of the two, and by the choice of suitable alcohols it is easy to obtain products in which R may be methyl, ethyl, propyl, amyl, octyl, lauryl, dodecyl, octadecyl or any other desired alkyl group. Any of these alkoxypropylamines, either primary or secondary, may be condensed with monoalkylol cyanamides or their dimers in accordance with the present invention, but primary and secondary amines containing at least 5 carbon atoms and preferably 8–18 carbon atoms are preferred when guanidine derivatives of good surface active properties are desired.

The substituted guanidine derivatives of the present invention are prepared by heating any of the above described mono- or di-alkoxypropylamines with a monoalkyl cyanamide, either as such or in its dimerized form, in the presence of sufficient acid to make the reaction mixture substantially neutral to phenophthalein. The proper degree of acidity can be obtained by adding the amine in the form of an amine salt of an acid not substantially weaker than acetic acid, but the same result can be obtained by mixing the free amine with the alkylol cyanamide and then adding acetic, hydrochloric, sulfuric or other acid until a test sample is substantially neutral or acid in reaction. The mixture is then heated, preferably at 100–160° C., until the condensation is complete, which usually requires from 15 to 60 minutes, depending on the temperature conditions employed.

The products of the present invention vary in physical properties from oily liquids to wax-like solids, depending largely on the type of alkoxypropylamine used. When amines of relatively low molecular weight are employed, such as mono- or dimethoxypropyl or amyloxypropylamines or mono-hexyl, -heptyl or -octyl oxypropylamines, the products are viscous liquids which are readily soluble in water. The substituted guanidines or biguanides obtained by condensing monoalkylol cyanamides with higher alkoxypropylamines such as mono- or didecyl, dodecyl, tetradecyl or octadecyl oxypropylamines are light-colored waxy products which are dispersible in hot water but soluble therein by the addition of acid. All the products of the present invention are soluble in aqueous solutions of organic and mineral acids and are stable against decomposition in acid solution.

Condensation products of alkoxypropylamines with alkylol cyanamides possess definite surface activity and can be employed as cation-active emulsifying agents, detergents in acid solution, wetting agents, demulsifiers for breaking oil emulsions, and particularly in textile finishing processes where their cation-active properties impart an affinity for textile fibers such as cotton and regenerated cellulose. They are especially important in the preparation of finely divided pigments such as lithopone and the like, and we have found that they possess the property of dispersing pigments of this type when present during their formation by precipitation processes.

The invention will be illustrated in further detail by the following specific examples. It should be understood, however, that although these examples may describe in detail certain of the preferred aspects of the invention they are given primarily for purposes of illustration and the invention in its broader aspects is not limited thereto.

EXAMPLE 1

*1-ethylol-3-(3-methoxypropyl) guanidine hydrochloride*

21.6 parts by weight of 80% monoethylol cyanamide, 17.8 parts of 3-methoxypropylamine and 20 parts of 37% hydrochloric acid were mixed and heated at 105° C. for 5 minutes. The reactants were then heated at 120–135° C. for one hour longer, whereupon a pale yellow, viscous, oil-like liquid was obtained in a yield of 41.6 parts by weight. Two parts by weight of additional concentrated hydrochloric acid were then added, since the mixture was still slightly alkaline. The product was easily soluble in water and in ethyl alcohol, but insoluble in benzol.

EXAMPLE 2

9.7 parts by weight of 90% monoethylol cyanamide were added to 32.8 parts of a substantially equimolecular mixture of mono-octadecoxypropylamine and di-octadecoxypropylamine together with 6 parts of glacial acetic acid. The mixture was stirred and heated at 130° C. for 15 minutes, whereupon a cream-colored, waxy product was formed. This product was readily dispersible in hot water to give a gel-like suspension. It consisted of a mixture of substantially equimolecular quantities of 1-ethylol-3-di-(octadecoxypropyl) guanidine acetate and 1-ethylol-3-octadecoxypropyl guanidine acetate.

EXAMPLE 3

*1-ethylol-3-amyloxypropyl guanidine acetate*

47.8 parts by weight of 90% monoethylol cyanamide were mixed with 33 parts of glacial acetic acid and heated with stirring to form a salt. The mixture foamed during the heating, and when the foaming ceased 72.5 parts by weight of 3-amyloxypropylamine were added. When the initial exothermic reaction had subsided more acetic acid was added until an aqueous solution of a test portion was neutral to phenolphthalein, whereupon the mixture was heated slowly to 160° C. The product was obtained as a pale yellow liquid, easily soluble in water.

EXAMPLE 4

7 parts by weight of glacial acetic acid were added to 24.1 parts of dodecyloxypropylamine, which was then mixed with 9.55 parts of 90% monoethylol cyanamide. The mixture was melted and heated with stirring to 120° C. and maintained at this temperature for 30 minutes, or until a uniform homogeneous product was obtained. The product was 1-ethylol-3-dodecyloxypropyl guanidine acetate, which on cooling was a soft waxy material soluble in warm water.

EXAMPLE 5

*Preparation of lithopone*

17 parts by weight of barium sulfide were dissolved in 100 parts of water by stirring and heating at 75–80° C. and two parts of 1-ethylol-3-dedecyloxypropyl guanidine acetate (prepared as in Example 4) were dissolved by stirring while maintaining the solution at a temperature of 75° C. A solution of 28.8 parts by weight of $ZnSO_4.7H_2O$ in 50 parts of water was heated to 75° C. and added to the barium sulfide solution while stirring. A voluminous white precipitate appeared immediately and the mixture became thick. To this mixture was then added 100 parts of water at 75° C. and the mixture was stirred for 20 minutes, filtered and the filter cake washed three times with water at 75° C. The filter cake was then dried.

Another sample of lithopone was prepared by exactly the same procedure, with the exception that no guanidine compound was added, for purposes of comparison. It was found that a more rapid and voluminous precipitate and a higher filtration rate were obtained when the guanidine derivative was present, and the dried lithopone prepared with the aid of the guanidine derivative was softer and could be crushed with considerably greater ease. Microscopic examination showed that the average size of the guanidine-treated material was smaller than that of the product prepared without the addition of the guanidine.

What we claim is:

1. Condensation products of alkoxypropylamines of the formula

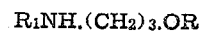

wherein R is an alkyl radical and $R_1$ is a member of the group consisting of hydrogen and alkoxypropyl radicals, with alkylol cyanamides of the formula $$(N \equiv C.NH.R_2.OH)_n$$

wherein $n$ is a whole number not greater than 2 and $R_2$ is a member of the group consisting of alkyl, alkoxyalkyl and hydroxyalkyl radicals.

2. Condensation products of alkoxypropylamines of the formula $$R_1.NH.(CH_2)_3.OR$$

wherein R is an alkyl radical containing at least 5 carbon atoms and $R_1$ is a member of the group consisting of hydrogen and alkoxypropyl radicals, with alkylol cyanamides of the formula $$(N \equiv C.NH.R_2.OH)_n$$

wherein $n$ is a whole number not greater than 2 and $R_2$ is a member of the group consisting of alkyl, alkoxyalkyl and hydroxyalkyl radicals.

3. Condensation products of alkoxypropylamines of the formula $$HN\begin{cases}(CH_2)_3.OR\\(CH_2)_3.OR\end{cases}$$

wherein R is an alkyl radical, with alkylol cyanamides of the formula $$(N \equiv C.NH.R_2.OH)_n$$

wherein $n$ is a whole number not greater than 2 and $R_2$ is a member of the group consisting of alkyl, alkoxyalkyl and hydroxyalkyl radicals.

4. The method of producing condensation products of alkoxypropylamines with monoalkylol cyanamides which comprises heating a member of the group consisting of the monomer and the dimer of a monoalkylol cyanamide with an alkoxypropylamine in the presence of sufficient acid to make the reaction mixture at least neutral to phenolphthalein.

5. The method of producing condensation products of alkoxypropylamines with monoalkylol cyanamides which comprises heating a member of the group consisting of the monomer and the dimer of a monoalkylol cyanamide with a di-(alkoxypropyl) amine in the presence of sufficient acid to make the reaction mixture at least neutral to phenolphthalein.

LOUIS C. JONES.
WALTER P. ERICKS.